Nov. 19, 1957 — L. E. KILMARX, JR — 2,813,568
TUBELESS TIRE VALVE
Filed Feb. 21, 1956

INVENTOR
LOUIS E. KILMARX, JR.
BY
Churchill, Rich, Weymouth & Engel
ATTORNEYS.

United States Patent Office 2,813,568
Patented Nov. 19, 1957

2,813,568

TUBELESS TIRE VALVE

Louis E. Kilmarx, Jr., Massapequa Park, N. Y., assignor to Scovill Manufacturing Company, Waterbury, Conn., a corporation of Connecticut Application February 21, 1956, Serial No. 566,820

10 Claims. (Cl. 152—427)

The present invention relates to tubeless tire valves and aims to provide certain improvements therein.

In the use of tubeless tires it is necessary to provide a fluid-tight seal between the tire valve stem and the rim upon which the tubeless tire is mounted. Heretofore the seal between the valve stem and the hole in the rim through which the valve stem is mounted has been made in one of the following ways: (a) by packing washers and a clamping nut mounted over the valve stem so that the washers will seal the hole at opposite faces of the rim; (b) by welding the valve stem to the rim; and (c) by employing a rubber covered valve stem which is force-fitted into the rim hole. While each of these methods possesses certain advantages, a primary consideration in the mass assembly of the valve stems on the tubeless tire rims is the time required to mount the valve stem.

Accordingly, it is an object of the present invention to provide a tubeless tire valve stem which can be rapidly mounted on the rim and form a leak-tight seal therewith.

A further object of the invention is to provide a valve stem which can be rapidly and efficiently mounted on a rim from either the tire side thereof before the tire is mounted on the rim or from the outside of the rim, either before or after the tire has been mounted.

A still further object of the invention is to provide a valve stem which can be quickly mounted on a rim by force-applying means such as an air hammer or the like.

The foregoing and other objects of the invention, not specifically enumerated, are accomplished by forming a metal valve stem with an enlarged flange at or adjacent its rim-engaging end, said flange having in one face thereof an annular groove adapted to accommodate an O-ring packing for engagement with a face of the rim to make a fluid-tight seal therewith surrounding the valve stem hole in the rim and with a peripheral annular recess in the shank of the valve stem axially spaced from the flange and relying upon a collar member having a deformable bead to lock within the annular recess on the shank and over the edge of the hole in the face of the rim opposite to that which is engaged by the O-ring packing, the valve stem parts being so related that when the valve stem shank adjacent the annular flange is driven through the collar disposed in the hole in the rim, the collar will lock the valve stem onto the rim with a fluid-tight seal.

The invention will be better understood from the detailed description which follows, when considered in connection with the accompanying drawings, wherein.

Figure 1:
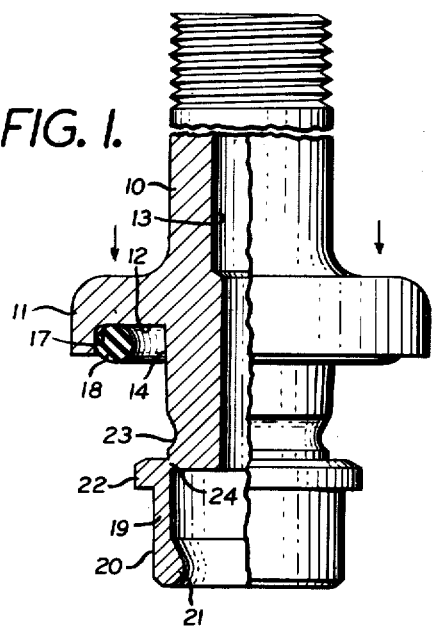
Figure 1 is an elevation, partly broken away, of a valve stem embodying the invention.
Figure 2:
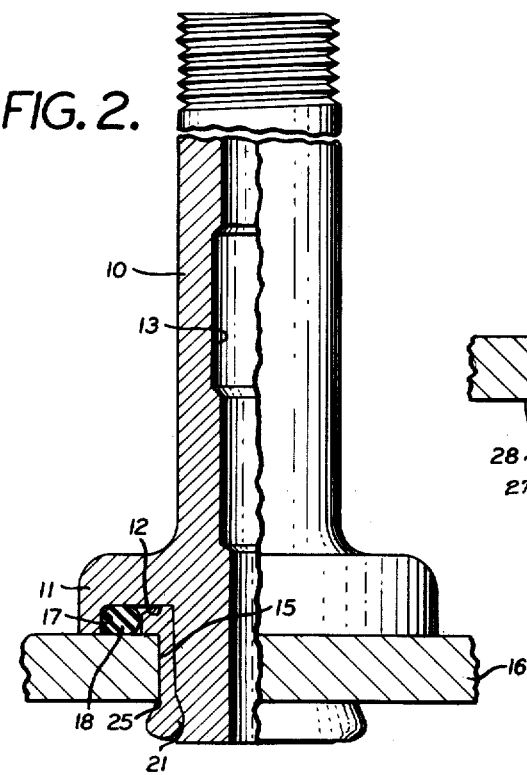
Fig. 2 is a view similar to Fig. 1 showing the valve stem secured to a rim.

Referring first to the embodiment of the invention shown in Figs. 1 and 2, the valve stem comprises a metal body portion 10 formed in proximity to the end thereof which is adapted to be secured to a tire supporting rim with an annular flange or peripheral rib 11 having an annular recess 12 formed in the face thereof adapted to engage a rim, and said body portion having a bore therethrough of different diameters, an enlarged portion 13 of which constitutes a valve core chamber. The inner wall of the annular recess 12 has a diameter which is substantially smaller than the diameter of a hole 15 in a rim 16 to which the valve stem is to be secured and said wall tapers slightly toward the axis of the body portion away from the flange 11. The outer wall 17 of the recess 12 has a diameter substantially larger than that of the hole 15. Adapted to be mounted in the recess 12 is an O-ring packing 18 having a normal outer diameter substantially equal to the outer diameter of the recess 12 and having a cross-sectional diameter somewhat greater than the axial depth of the recess 12. At its rim engaging end, the valve stem body portion 10 is integrally joined to a collar 19 having an axial dimension greater than the thickness of the rim 16, said collar having an external diameter 20 adapted to loosely fit within the rim hole 15 and an internal diameter equal to the external diameter of the body portion where it is joined to the collar, said collar being formed at its free end with a radial, inwardly extending bead 21 and at its other end with an outwardly directed, annular flange 22. The outer diameter of the flange 22 is smaller than the inner diameter of the O-ring packing 18 to allow for deformation of said packing. In close proximity to the integral connection between the collar 19 with the valve stem body portion proper, i. e., at the small end of the taper on the body, it is formed with a peripheral groove 23, which, in axial section, substantially complements the contour of the bead 21.

The valve stem is adapted to be mounted onto the rim 16 from the exterior thereof, either prior to or after a tubeless tire (not shown) has been mounted on the rim. To mount the valve stem on the rim, the collar 19 is inserted into the rim hole and when the flange 22 engages a face of the rim, the enlarged flange 11 is struck by an air hammer or the like, whereupon the collar is sheared from the valve stem body at 24 and, as the somewhat enlarged tapered portion of the body containing the recess 23 is driven into the collar 19 it expands said collar, and when it engages the bead 21 it expands and also deforms the bead outwardly into overlying relation to the rim at the rim hole, as shown at 25, to rigidly lock the valve stem onto the rim. When the recess 23 comes into complemental relation to the expanded bead 21 there is a partial spring-back of the bead into the recess but not enough to destroy the rigid mounting of the stem. When this occurs, the O-ring packing 18 will be deformed and held under compressive force to provide a leak-tight seal with the outer face of the rim.

Figure 3:
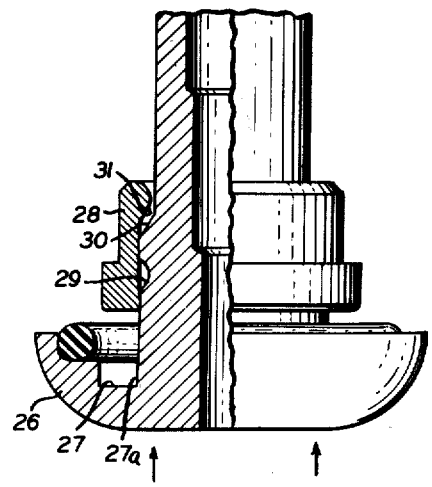
Fig. 3 is a view similar to Fig. 1 showing another embodiment of the invention.
Figure 4:
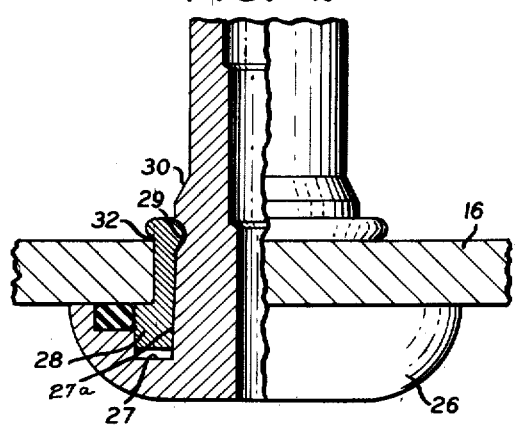
Fig. 4 is a view similar to Fig. 3 showing the valve stem of Fig. 3 secured to a rim.

In the embodiment of the invention shown in Figs. 3 and 4, the annular flange designated 26 is formed at the extreme end of the body portion and the O-ring packing recess in said flange is formed with a secondary annular recess 27 which provides the valve stem with an exterior surface 27a which tapers slightly toward the axis of the stem away from the flange 26, the diameter of said surface being substantially less than the diameter of the hole in the rim. A collar 28 substantially corresponding to the collar 19 of Fig. 1 is separately formed from the valve stem body portion and the flanged end thereof when inversely disposed in relation to the valve stem slidably fits over the smaller end of the surface 27a of the valve stem, which latter is provided with an annular recess 29 corresponding to the recess 23 in Fig. 1. The valve stem at the small end of the tapered surface 27a is formed with a pronounced second tapered surface 30 for cooperative engagement with a complementally tapered surface 31 on the inwardly directed bead of the collar.

In mounting the valve stem shown in Figs. 3 and 4 onto a rim, the collar 28 will normally rest against the tapered surface 27a on the valve stem and may be inserted into the hole in the rim together with the valve stem. As the valve stem is inserted through the hole in the rim from the tire side thereof, the beaded end of the collar will pass through the rim hole and the flange on the collar will come to rest against the inner or tire supporting face of the rim. Now, when force is applied in an axial direction to the flange 26 on the valve stem body portion toward the rim, the tapered surface 30 on the body portion will engage the tapered surface 31 on the head of the collar and deform and flare said bead outward radially to engage over the inner face of the rim at the edge of the hole therein, as shown at 32. While this does not form a seal, it adds to the rigidity of the assembly of the valve stem on the rim. The O-ring packing is thereupon completely trapped between the flange on the collar and the outer face of the rim and forms a leak-tight seal between the valve stem and the rim. As explained in connection with the assembly of Fig. 2 there is a partial spring-back of the bead on the collar into the groove 29 to hold the valve stem rigidly on the rim.

By virtue of the manner in which the collar cooperates with the valve stem body in the course of the assembly of the stem onto the rim, there is provided, in effect, a self-riveting valve stem which, according to Figs. 1 and 2, can be driven in from either face of the rim and, according to Figs. 3 and 4, from the tire face of the rim without a "hold-on" tool and provide a leak-tight seal by a static O-ring packing which is held under compressive deformation.

While there has been shown and described two embodiments of the invention, it is to be understood that changes in details of construction may be resorted to within the range of engineering skill without departing from the spirit of the invention as hereinafter claimed.

What I claim is:

1. A tire valve stem comprising a tubular body portion formed with an annular flange in proximity to one end thereof and adapted to be secured to a rim, said annular flange having an annular recess in the rim-engageable face thereof, an O-ring packing seating in said annular recess, said body portion having a peripheral annular recess in axial spaced relation to the flange and a tubular collar of greater axial dimension than a rim in which the valve stem is to be mounted, said collar having an internal diameter adapted to be slidably forced over the body portion between the peripheral recess and the flange, and an external diameter to loosely fit within a hole in such rim, said collar having at one end an outwardly directed flange adapted to engage one face of such rim and at its end having an inwardly directed bead adapted to be forced radially outward by the body portion as the collar is moved thereover and to snap into the peripheral recess.

2. A tire valve stem according to claim 1, wherein the tubular body portion tapers toward the axis thereof away from the annular flange thereon and the smallest diameter of said tapered portion is no larger than the internal diameter of the collar at the flanged end thereof.

3. A tire valve stem according to claim 1, wherein the outer diameter of the flange on the collar is less than the normal inner diameter of the O-ring packing.

4. A tire valve stem according to claim 1, wherein the radial smallest dimension of the bead on the collar is less than the radial smallest dimension of the peripheral recess in the body portion.

5. A tire valve stem according to claim 1, wherein the collar at the flanged end thereof is initially joined integrally to the body and is adapted to be sheared from said body by a force applied to the body portion in an axial direction toward the collar.

6. A tire valve stem according to claim 1, wherein the collar and the body portion are separate members.

7. A tire rim and valve stem assembly for a tubeless tire, said rim having a valve stem hole therein, said valve stem comprising a body portion formed with an enlarged annular flange having an annular recess in one face thereof and a part adjacent the flange extending through the valve stem hole in the rim, an O-ring packing in the recess engaging a face of the rim and a collar extending through the hole in the rim surrounding the part of the body portion which extends therethrough, said collar having at one end an outwardly extending flange engaging the face of the rim adjacent the O-ring packing and at its other end having an enlargement overlying a portion of the body and the opposite face of the rim surrounding the hole therein, said collar serving to hold the valve stem onto the rim with the O-ring packing in fluid-tight engagement with the rim.

8. A tire valve rim and valve stem assembly according to claim 7, wherein the enlarged flange on the body is at the inner end of the body portion and overlies the tire engaging face of the rim.

9. A tire rim and valve stem assembly according to claim 7, wherein the enlarged flange on the body is in axially spaced relation to the inner end of the body portion and overlies the radial inner face of the rim.

10. A tire rim and valve stem assembly according to claim 7, wherein the body portion is formed with a peripheral annular recess in axial spaced relation to the flange into which recess the enlargement on the collar seats.

References Cited in the file of this patent

UNITED STATES PATENTS 2,621,700   Snyder _____ Dec. 16, 1952

FOREIGN PATENTS 510,914   Canada _____ Mar. 18, 1955

UNITED STATES PATENT OFFICE
CERTIFICATE OF CORRECTION

Patent No. 2,813,568

November 19, 1957

Louis E. Kilmarx, Jr.

It is hereby certified that error appears in the printed specification of the above numbered patent requiring correction and that the said Letters Patent should read as corrected below.

Column 3, line 58, after "its" insert -- other --.

Signed and sealed this 7th day of January 1958.

(SEAL)

Attest:

KARL H. AXLINE
Attesting Officer

ROBERT C. WATSON
Commissioner of Patents